United States Patent [19]
Wheeler et al.

[11] Patent Number: 5,581,891
[45] Date of Patent: Dec. 10, 1996

[54] HEDGE TRIMMER WITH COMBINATION SHEARING AND SAWING BLADE ASSEMBLY

[75] Inventors: Dale K. Wheeler, Fallston; Robert A. Meloni, Baltimore; Tae Lee, Arnold, all of Md.

[73] Assignee: Black & Decker Inc., Newark, Del.

[21] Appl. No.: 289,935

[22] Filed: Aug. 12, 1994

[51] Int. Cl.[6] .................................................. B26B 19/04
[52] U.S. Cl. ........................... 30/216; 56/242; 83/837
[58] Field of Search ........................ 30/208, 209, 210, 30/216; 83/835, 837; 56/242, 296, 299

[56] References Cited

U.S. PATENT DOCUMENTS

| | | |
|---|---|---|
| D. 325,856 | 5/1992 | Gierke . |
| 2,212,430 | 8/1940 | Zimmerman . |
| 2,558,459 | 6/1951 | Podner . |
| 2,573,573 | 10/1951 | Jenkins . |
| 3,143,798 | 8/1964 | Lundquist . |
| 3,193,925 | 7/1965 | Hawley . |
| 3,212,188 | 10/1965 | Riley, Jr. et al. . |
| 3,217,408 | 11/1965 | Jepson et al. . |
| 3,309,769 | 3/1967 | Maxson . |
| 3,364,574 | 1/1968 | Stelljes et al. . |
| 3,564,714 | 2/1971 | Wells . |
| 3,579,827 | 5/1971 | Grahn . |
| 3,715,805 | 2/1973 | Fraser . |
| 3,757,194 | 9/1973 | Weber et al. . |
| 3,802,222 | 4/1974 | Weber . |
| 3,897,630 | 8/1975 | Glover et al. . |
| 3,962,924 | 6/1976 | Glover et al. . |
| 4,216,582 | 8/1980 | Paule et al. ........................ 30/216 |
| 4,280,276 | 7/1981 | Comer et al. . |
| 4,592,143 | 6/1986 | Pizzuto et al. ..................... 30/216 |
| 4,856,195 | 8/1989 | Grossmann et al. . |
| 4,875,879 | 10/1989 | Bunyea et al. . |
| 5,031,395 | 7/1991 | Ohkanda et al. . |
| 5,075,972 | 12/1991 | Huang ................................. 30/216 |
| 5,093,999 | 3/1992 | Raetz et al. ...................... 30/210 X |
| 5,235,752 | 8/1993 | Sauerwein et al. . |
| 5,261,162 | 11/1993 | Siegler . |

FOREIGN PATENT DOCUMENTS

| | | |
|---|---|---|
| 0422773 | 4/1991 | European Pat. Off. . |
| 1137485 | 5/1957 | France . |
| 2452869 | 10/1980 | France . |
| 1031556 | 8/1955 | Germany . |
| 2006838 | 8/1971 | Germany . |
| 4300215 | 7/1994 | Germany . |
| 736982 | 9/1955 | United Kingdom ................ 56/296 |
| 1379073 | 1/1975 | United Kingdom . |

*Primary Examiner*—Hwei-Siu Payer
*Attorney, Agent, or Firm*—Harness, Dickey & Pierce, P.L.C.

[57] ABSTRACT

A hand-held power-operated hedge trimmer for trimming plant growth such as hedges, shrubs, tree branches and the like. The hedge trimmer includes a housing containing a motor assembly, a blade assembly extending forwardly in a lengthwise direction from the housing, and a drive mechanism for coupling a movable cutting blade of the blade assembly to an output of the motor assembly for causing reciprocatory rectilinear movement of the movable cutting blade relative to a stationary combing blade in response to selective actuation of the motor assembly. The cutting blade includes a series of cutter teeth formed along its opposite longitudinal edges with each cutter tooth having a compound tooth profile. The compound tooth profile includes a pair of shear tooth segments formed along opposite lateral edges of the cutter tooth and a saw tooth segment formed at its distal edge between the shear tooth segments. In addition, a series of sizing lugs are formed along the opposite longitudinal edges of the movable cutting blade between each pair of adjacent cutter teeth for establishing entrapment channels therewith. In operation, smaller twigs and branches are drawn into the entrapment channels and into alignment with the adjacent shear tooth segment for shear-cutting with a single stroke of the cutting blade. The sizing lugs prevent larger branches from being drawn into the entrapment channels so as to align them relative to the saw tooth segments for saw-cutting with a multi-stroke sawing action.

51 Claims, 9 Drawing Sheets

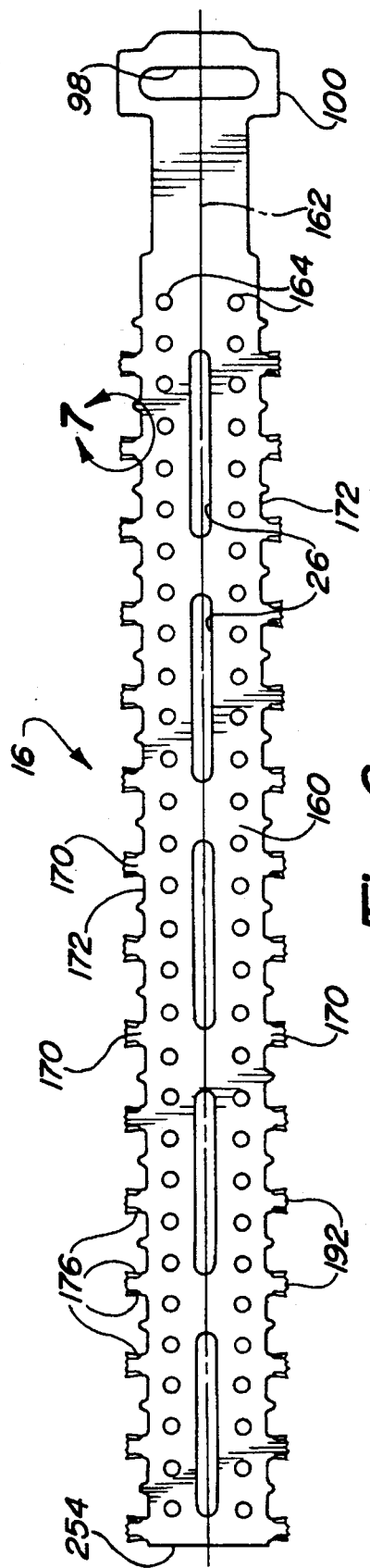
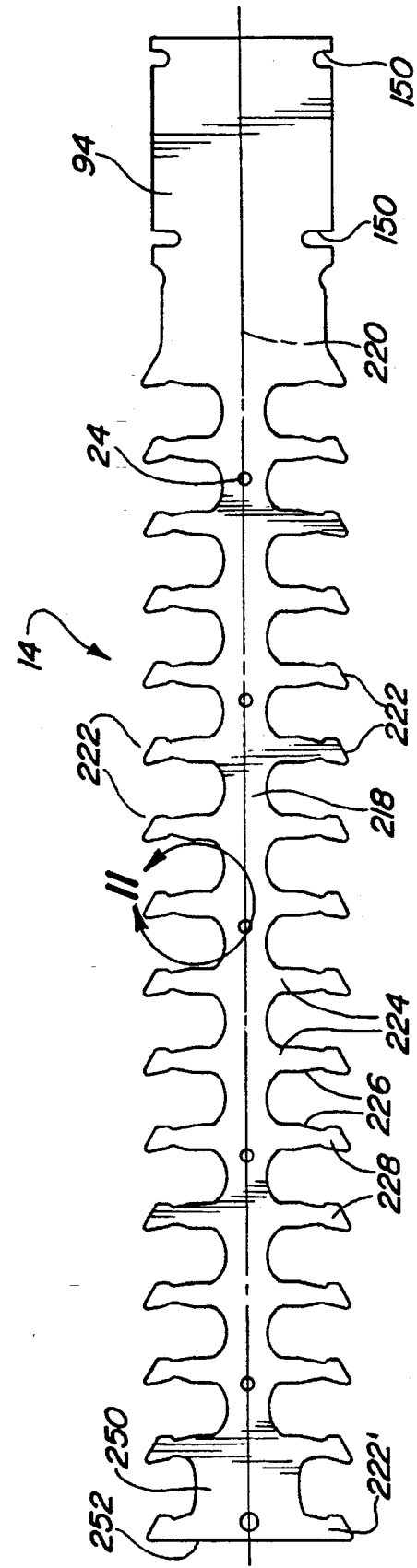
Fig-6
Fig-10

HEDGE TRIMMER WITH COMBINATION SHEARING AND SAWING BLADE ASSEMBLY

FIELD OF THE INVENTION

The invention relates generally to portable power-operated hedge trimmers and, more particularly, to an improved trimmer blade assembly that is capable of producing both a single-stroke shear-cutting action and a multi-stroke saw-cutting action along a common longitudinal edge thereof.

BACKGROUND OF THE INVENTION

As is known, a plethora of portable power-operated (i.e., gas or electric) hedge trimmers are commercially available for pruning plant growth such as, for example, shrubs, hedges, stalks, small twigs and branches, and the like. Traditionally, portable hedge trimmers include a blade assembly having a pair of overlying elongated toothed blades at least one of which is reciprocally driven to establish a "shear-cutting" action therebetween. In particular, cutter teeth are formed on at least one longitudinal edge of a shearing blade which cooperate with comb teeth formed on a corresponding longitudinal edge of a combing blade for shear-cutting the plant growth introduced therebetween during a single blade stroke. In some applications, both the shearing blade and combing blade are reciprocally driven to establish a counter-reciprocating blade assembly. In other applications, the cutter teeth on the reciprocating shearing blade cooperate with the comb teeth on a stationary combing blade to likewise establish the single-stroke shear-cutting action.

A problem routinely encountered during use of a portable hedge trimmer is its inability to shear large twigs and branches due to the limited cutting path established between the relatively close spacing of adjacent cutter and comb teeth. Moreover, industry standards have been established which set forth specific limitations on the maximum size (i.e., ¾" in diameter) of the plant growth that can be introduced into the cutting path of the reciprocating trimmer blade(s). Despite the existence of this maximum size limitation, many conventional hedge trimmers are designed to only accept introduction of plant growth up to ⅜" in diameter due, in large part, to the additional power requirements needed for shearing larger twigs and branches. Thus, it is commonly necessary for any plant growth of a size exceeding such size limitations to be pruned using a different cutting tool such as, for example, a hand saw or a power-operated reciprocating saw or chain saw.

In an effort to overcome the above-noted shortcomings and limitations, it has been proposed to install a reciprocating saw as an adjunct to the blade assembly for enabling the hedge trimmer to establish a "saw-cutting" action in addition to the "shear-cutting" action. In most instances, an auxiliary saw blade segment is either mounted to, or formed as an integral extension of, at least one of the reciprocally movable trimmer blades. Various examples of such a combination hedge trimmer and reciprocating saw are shown and disclosed in U.S. Pat. No. 3,143,798 to Lundquist, U.S. Pat. No. 3,217,408 to Jepson, and U.S. Pat. No. 4,280,276 to Comer et al. While these combination power tools provide a greater capacity for cutting shrubbery, each requires special manipulation to be used effectively. More specifically, the operator must use the hedge trimmer section of the reciprocating blade assembly for shearing the smaller plant growth while the reciprocating saw section of the reciprocating blade assembly is used for sawing the larger twigs and branches. Thus, the operator is required to cognitively classify the plant growth by size prior to engaging the corresponding cutting section of the blade assembly therewith. This requirement places an encumbrance on the operator limiting concurrent use of the hedge trimmer section and the reciprocating saw section of the combination power tool since the cutting rate for each section is different. As is also apparent, such combination hedge trimmers are rather bulky and overly cumbersome, requiring greater dexterity on the part of the operator as compared to use of traditional hedge trimmers, and are inherently more expensive due to inclusion of the auxiliary saw blade components.

SUMMARY OF THE INVENTION

Therefore, it is an object of the present invention to overcome the disadvantages of the prior art by providing an improved blade assembly for a power-operated hedge trimmer that is capable of concurrently establishing both a single-stroke shear-cutting action and a multi-stroke saw-cutting action along a common longitudinal edge thereof.

As a related object, the improved blade assembly of the present invention includes a reciprocally movable cutting blade with cutter teeth formed along its opposite longitudinal edges, each cutter tooth having a compound toothform including a "shear" tooth segment for shear-cutting smaller branches and a "saw" tooth segment for saw-cutting larger branches.

It is another object of the present invention to provide the improved blade assembly with a mechanism for automatically segregating the plant growth by size with respect to the cutter teeth on the movable cutting blade by aligning smaller twigs and branches relative to the shear tooth segments and aligning larger twigs and branches relative to the saw tooth segments.

Yet another object of the present invention is to provide the improved blade assembly with a stationary combing blade having a unique toothform for the comb teeth formed on the opposite longitudinal edges thereof and which cooperate with the cutter teeth on the movable cutting blade for cutting the plant growth.

A further object of the present invention is to provide a hedge trimmer having an increased cutting capacity and yet which generates reduced loading and stress on the drive mechanism for establishing lower power requirements compared to those associated with prior art devices.

According to a particular aspect of the present invention, there is provided a hand-held power-operated tool for trimming plant growth such as hedges, shrubs, tree branches and the like. In accordance with a preferred construction, the portable power tool is a hedge trimmer comprised of a housing containing a motor assembly, a blade assembly extending forwardly in a lengthwise direction from the housing, and a drive mechanism for coupling a movable cutting blade of the blade assembly to an output of the motor assembly for causing reciprocatory rectilinear movement of the movable cutting blade relative to a stationary combing blade in response to selective actuation of the motor assembly. The cutting blade includes a series of cutter teeth formed along its opposite longitudinal edges with each cutter tooth having a compound tooth profile. The compound tooth profile includes a pair of shear tooth segments formed along opposite lateral edges of the cutter tooth and a saw tooth segment formed at the cutter tooth distal edge between the shear tooth segments. In addition, a series of sizing lugs are formed along the opposite longitudinal edges of the movable cutting blade with each sizing lug located between a pair of adjacent cutter teeth for establishing entrapment channels therewith. Each sizing lug functions to segregate and align the plant growth by size with respect to either the shear tooth segment or the saw tooth segment of an adjacent cutter tooth. In operation, smaller twigs and branches are drawn into the entrapment channels and into alignment with the adjacent shear tooth segment for subsequent shear-cutting with a single stroke of the cutting blade. However, the sizing lugs prevent larger twigs and branches from being drawn into the entrapment channels so as to align them relative to the saw tooth segments for subsequent saw-cutting with a multi-stroke sawing action. In addition, a series of comb teeth are formed along opposite longitudinal edges of the stationary combing blade which have combing projections extending past the cutter teeth of the movable cutting blade to accept introduction of twigs and branches therebetween up to a predefined maximum size. The combing projections also function to maintain alignment of the larger twigs and branches relative to the saw tooth segments of the cutter teeth for promoting efficient saw-cutting thereof.

A further aspect of the present invention is directed to providing a set on the saw tooth segments of the cutter teeth in a manner replicating a saw blade for increasing the kerf and facilitating improved saw-cutting efficiency.

Accordingly, the innovative dual-cutting action established by the blade assembly of the present invention is a significant advancement over the prior art in that a power tool is now available that can be used in a manner similar to traditional hedge trimmers but which provides a common mechanisms for saw-cutting larger plant growth without excessive manipulation or the use of a different cutting tool.

Additional objects, advantages, and features of the present invention will be apparent to those skilled in the art after consideration of the following detailed description and the appended claims, taken in conjunction with the accompanying drawings.

BRIEF DESCRIPTION OF THE DRAWINGS

FIG. 6 is a plan view of the cutting blade associated with the improved blade assembly of the present invention;

FIG. 10 is a plan view of the stationary combing blade associated with the blade assembly of the present invention;

DETAILED DESCRIPTION OF THE PREFERRED EMBODIMENTS

For purposes of illustration, the drawings depict a portable power-operated cutting tool, hereinafter referred to as hedge trimmer 10, generally comprised of a hand-held power source 11 and a blade assembly 12 according to a preferred embodiment of the present invention. As will be detailed with greater specificity, hedge trimmer 10 is a hedge trimmer equipped with an improved blade assembly 12 that is capable of concurrently producing both a single stroke "shear-cutting" action and a multi-stroke "saw-cutting" action along at least one of its longitudinal edges. Power source 11 is merely exemplary of that commonly used in electric hedge trimmers, and it should be apparent to those skilled in the art that the improved blade assembly 12 of the present invention is equally applicable for use with other power-operated hedge trimmers (i.e., gasoline engine and cordless).

Figure 1:
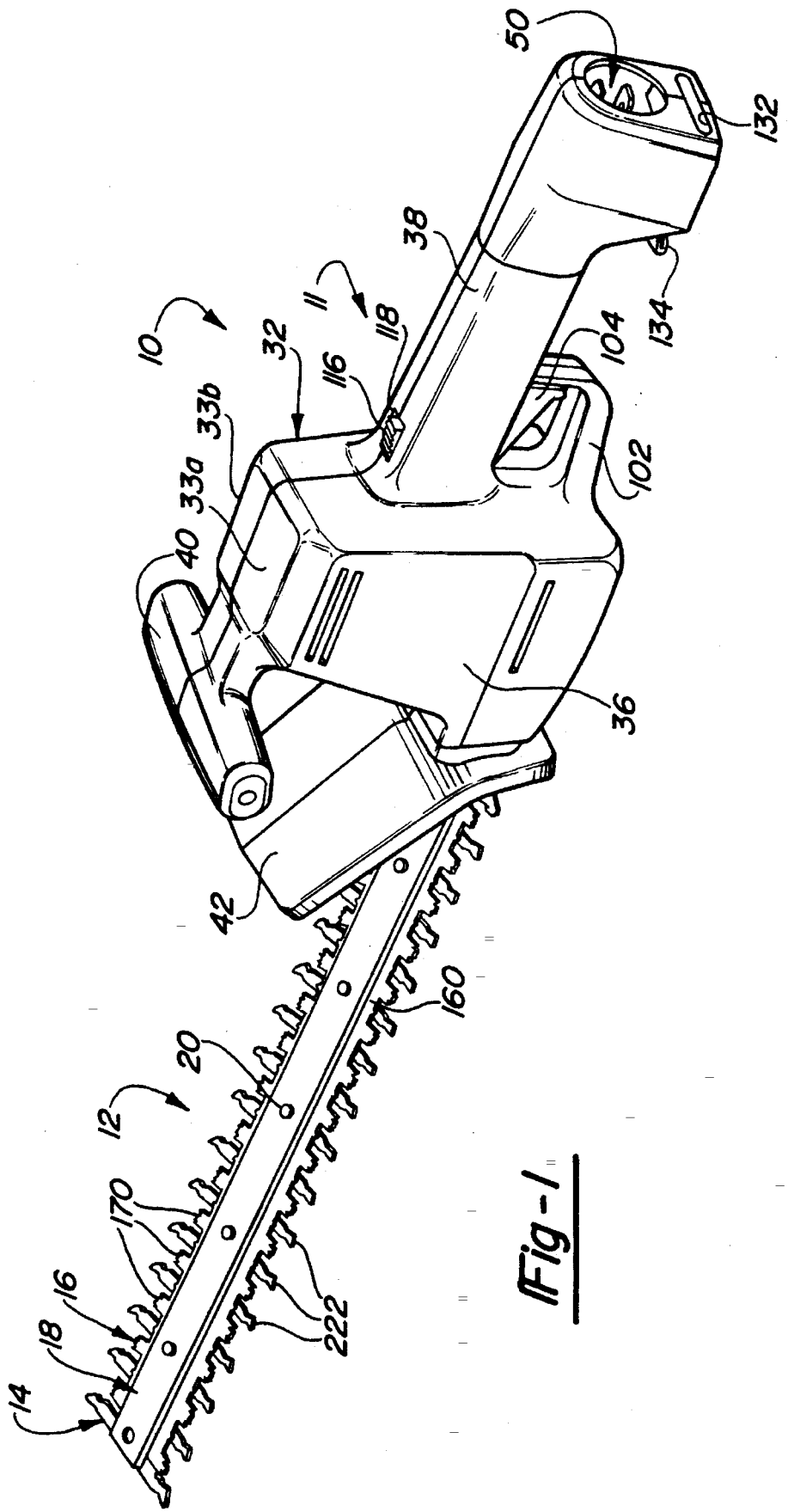
FIG. 1 is a side perspective view of an exemplary portable hedge trimmer equipped with the improved blade assembly of the present invention.
Figure 2:
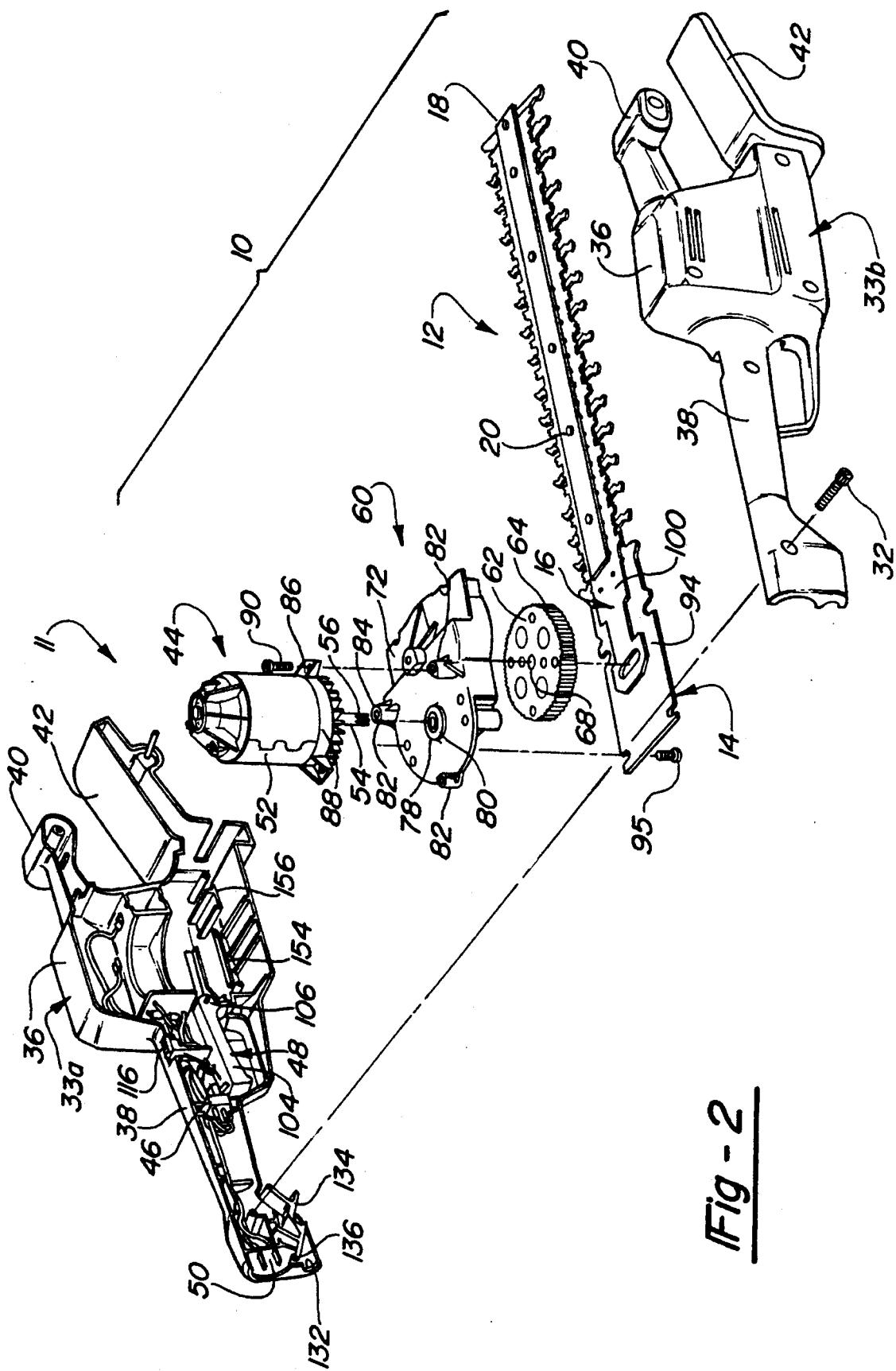
FIG. 2 is an exploded perspective view of the portable hedge trimmer shown in FIG. 1.
Figure 5:
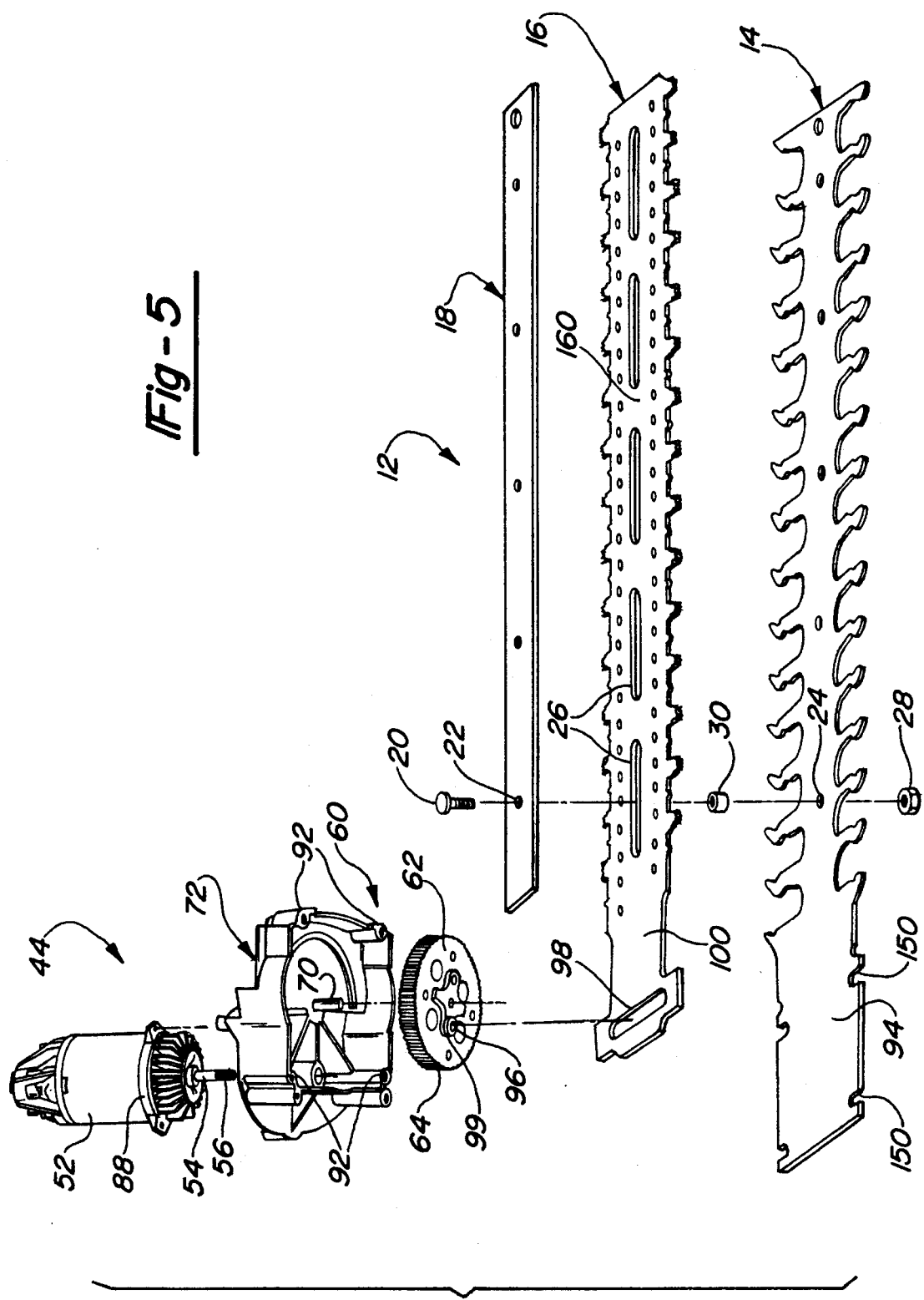
FIG. 5 is an exploded perspective view of the motor-driven components associated with the hedge trimmer of FIG. 1.

In its most basic form as shown in FIGS. 1, 2, and 5, blade assembly 12 includes a stationary combing blade 14, a reciprocally movable cutting blade 16, and a stationary cover plate 18. Each component is oriented in a face-to-face juxtapositioned relationship with cutting blade 16 positioned for lengthwise reciprocal rectilinear movement between cover plate 18 and combing blade 14. As is best seen from FIG. 5, bolts 20 passing through a series of aligned mounting apertures 22 and 24 formed in cover plate 18 and combing blade 14, respectively, also pass through a series of elongated guide slots 26 formed in cutting blade 16 and are fastened via nuts 28 for securing the individual components as blade assembly 12. To maintain a non-contact sliding relationship between cutting blade 16 and both cover plate 18 and combing blade 14, sleeve spacers 30 surround an intermediate portion of bolts 20 and have a length that is slightly in excess of the thickness of cutting blade 16.

Again referring to FIGS. 1 and 2, portable hedge trimmer 10 is shown to include a housing 32 formed from two complementary clamshell half-sections 33a and 33b that are joined and secured together by bolts 34 (one shown). Housing 32 is preferably constructed of a molded plastic material and generally includes a motor housing portion 36, a rear handle portion 38, a T-shaped front handle portion 40, and a forwardly angulated shield portion 42. Referring to FIG. 2, a power-operated mechanism is mountable within housing 32 for controlling actuation of blade assembly 12 and generally includes a motor assembly 44, an on/off switch 46 that is electrically connected to motor assembly 44, a trigger mechanism 48 for selectively actuating on/off switch 46, and various electrical wires and leads electrically connecting the terminal plugs of a male receptacle 50 to on/off switch 46 and motor assembly 44 for controlling the application of electrical power thereto. Motor assembly 44 is retained within motor housing portion 36 and includes a conventional electric motor 52 having a rotary output shaft 54 with a pinion 56 formed on the distal end thereof. As best seen from FIG. 4, output shaft 54 of motor 52 rotates about an axis, indicated by reference line 58, which is normal to the plane through which movable cutting blade 16 reciprocates.

Figure 4:
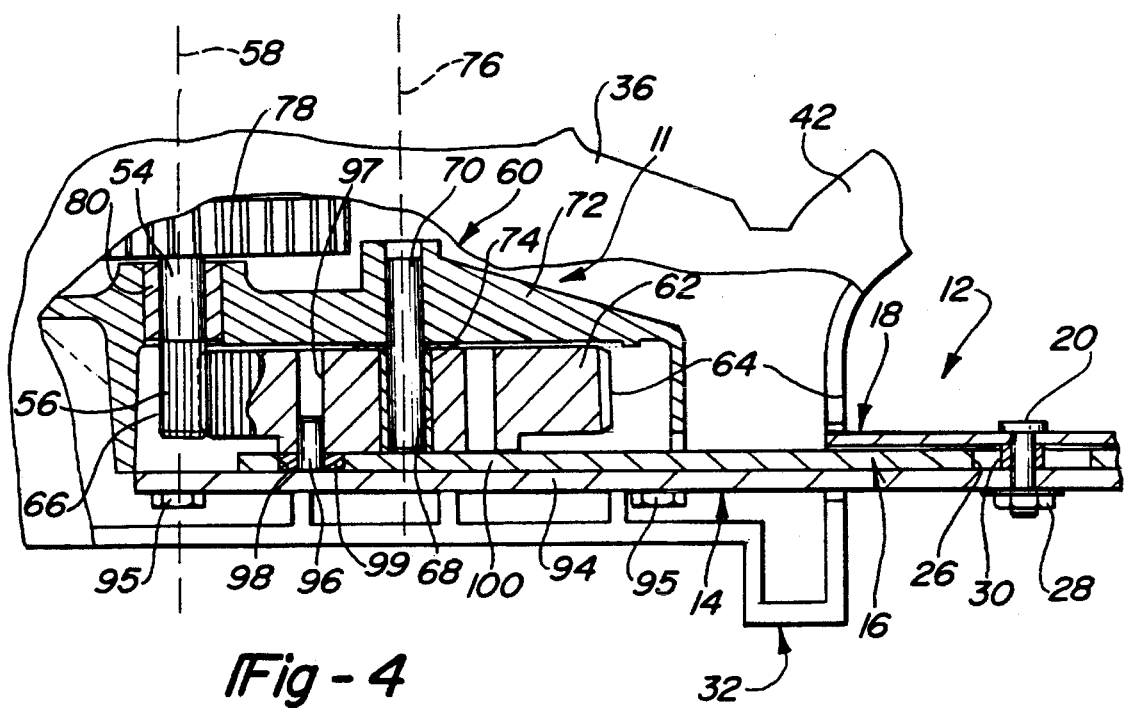
FIG. 4 is an enlarged partial side view of the hedge trimmer shown in FIG. 1, partly broken away and sectioned to illustrate the motor, speed-reducing drive mechanism and blade assembly in greater detail.

With reference to FIGS. 2, 4 and 5, motor assembly 44 is also shown to include a speed-reducing drive mechanism 60 comprised of a large spur gear 62 with its peripheral teeth 64 adapted for meshed engagement with teeth 66 on pinion 56. Spur gear 62 has a central bore 68 which is journally supported for rotation on a non-rotatable stub shaft 70 extending downwardly from within a recessed chamber formed in a motor mount casing 72. A sleeve bearing 74 is retained within central bore 68 for journally supporting spur gear 62 for rotation about stub shaft 70. Thus, spur gear 62 rotates about an axis, indicated by reference line 76, which is parallel to the rotational axis 58 of output shaft 54 and thus is likewise normal to the plane through which cutting blade 16 reciprocates. Motor mount casing 72 also includes a bore 78 in which a sleeve bearing 80 is press-fit for journally supporting a non-toothed portion of motor output shaft 54 so as to ensure meshed alignment of pinion teeth 66 with spur gear teeth 64. In addition, motor mount casing 72 includes a plurality of upstanding lugs 82 having threaded bores 84 formed therein which are alignable with mounting apertures 86 formed in a motor flange 88 for securing electric motor 52 to motor mount casing 72 using suitable threaded fasteners 90 (one shown). Finally, as seen in FIGS. 2 and 5, a series of threaded mounting bores 92 are formed in lower wall segments of motor mount casing 72 for securing a mounting segment 94 of stationary comb blade 14 thereto using suitable threaded fasteners 95.

To provide means for generating reciprocatory rectilinear movement of cutting blade 16 in response to driven rotation of motor output shaft 54, a cylindrical drive pin 96 is provided which is press-fit in a bore 97 formed in spur gear 62 so as to extend downwardly from a lower lugged portion thereof. Drive pin 96 is nested within a cam follower slot 98 formed in a yoke segment 100 of movable cutting blade 16 which extends transversely to the length thereof. A washer 99 is shown journally surrounding drive pin 96 with its outer peripheral surface sized for sliding movement within cam follower slot 98. Thus, upon driven rotation of spur gear 62, drive pin 96 orbits about rotational axis 76 and, due to retention in cam follower slot 98, causes reciprocating longitudinal movement of cutting blade 16 relative to stationary comb blade 14 and cover plate 18.

Figure 3:
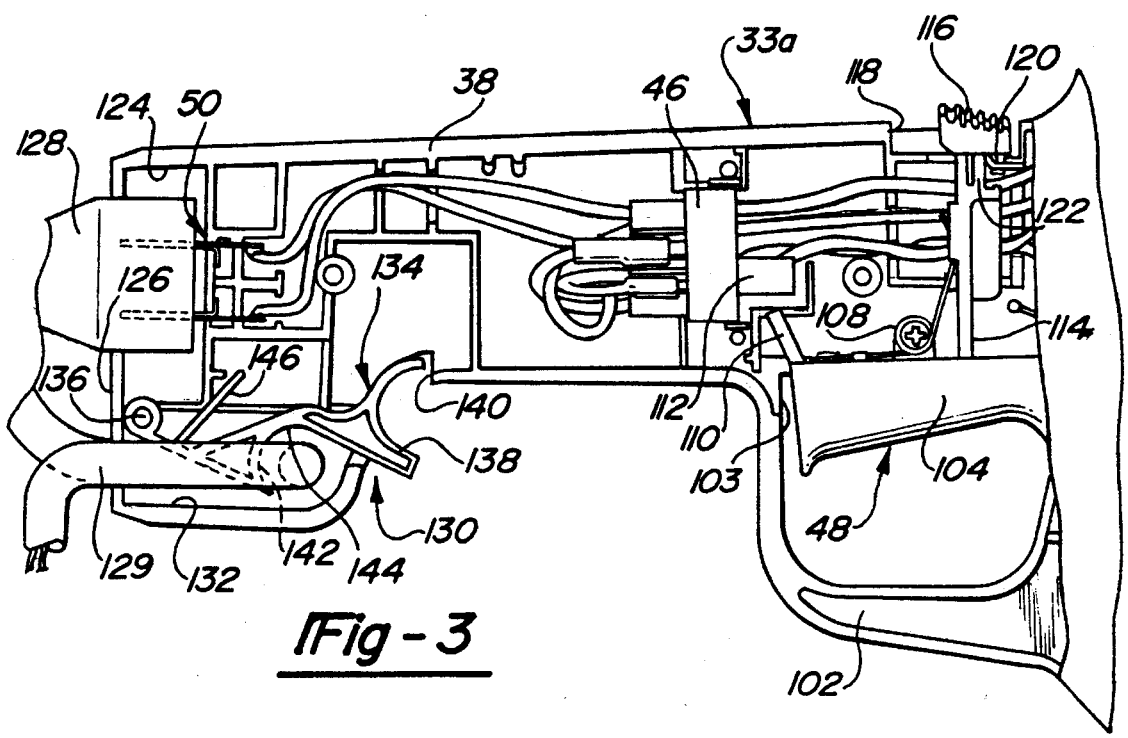
FIG. 3 is an enlarged partial side view of the hedge trimmer of FIG. 1, partly broken away to illustrate its trigger mechanism and cord retention system in greater detail.

With particular reference now to FIGS. 2 and 3, the various components provided for permitting selective actuation of motor assembly 44 will now be described in greater detail. Rear handle portion 38 of housing 32 is shown to include a trigger guard 102 within which a trigger 104 of trigger mechanism 48 is pivotably mounted so that it projects from an opening 103 in the underside of rear handle portion 38. In general, trigger 104 is adapted to actuate on/off switch 46 when trigger 104 is pivoted upwardly in a clockwise direction about a pivot post 106 and against the biasing of a trigger spring 108. When trigger 104 is pivoted about pivot post 106 in a clockwise direction against the biasing of trigger spring 108, an upstanding lug 110 engages a movable switch lever 112 of on/off switch 46 for moving it from the "off" position shown to an upwardly displaced "on" position. While not shown, means are provided for normally biasing switch lever 112 to its "off" position. As is also seen, one end of trigger spring 108 acts on an upstanding latch lug 114 formed integrally on trigger 104 and which has a lock button 116 formed at its distal end which extends through an upper opening 118 in rear handle portion 38. Latch lug 114 is normally biased in a forward direction such that a locking tab 120 formed in housing section 33a is retained within a lock channel 122 formed on an underside surface of lock button 116. As such, pivotable movement of trigger 104 about pivot post 106 is inhibited for normally locking trigger mechanism 48 in a lock-out mode. Trigger mechanism 48 can only be released by pulling rearwardly on lock button 116 for selectively disengaging locking tab 120 from locking channel 122.

On/off switch 46 is electrically connected between motor assembly 44 and male receptacle 50 mounted at the rear of rear handle portion 38. Male receptacle 50 is illustrated in the drawings as a conventional two-prong receptacle and is mounted within a recessed opening 124 formed in a rear face 126 of rear handle portion 38. Preferably, male receptacle 50 is sufficiently recessed so that its terminal plugs do not project beyond rear face 126 of rear handle portion 38. Recessed opening 124 is configured so it is easy to accommodate the enlarged female connector end 128 of a conventional 12- or 14-gauge outdoor extension cord 129. In addition, a cord retention system 130 is provided at the rearmost portion of rear handle portion 38 which is adapted to releasably secure a loop of extension cord 129 in a cavity 132 formed therein. More particularly, cord retention system 130 includes a cord retaining member 134 that is mounted for pivotable movement about a pivot post 136 and which includes a trigger segment 138 that projects from an opening 140 in the underside of rear handle portion 38, and a hook segment 142 that defines a semi-circular recess 144. In addition, retaining member 134 has an integrally formed spring arm 146 extending forward of pivot post 136 and which acts upon a flange 148 formed in the wall of housing sections 33a and 33b to normally bias retaining member 134 to the clockwise position shown. Further details of the construction and operation of cord retention system 130 may be found in U.S. Pat. No. 4,875,879 to Bunyea et al, which is assigned to the Assignee of the present invention.

With particular reference now to FIGS. 4 and 5, the drive connection between yoke segment 100 of cutting blade 16 and drive pin 96 is most clearly depicted. As seen, mounting segment 94 of combing blade 14 extends rearwardly beyond yoke segment 100 of cutting blade 16 and is provided with a series of slots or apertures 150 which are alignable with mounting bores 92 in casing 72 and adapted to receive cap screws 95 for the purpose of mounting combing blade 14 and, in turn, blade assembly 12 to motor mount casing 72. Such a relationship permits pre-assembly of both blade assembly 12 and motor assembly 44 prior to final assembly of the entire power-operated mechanism within housing 32 which is a highly desireable feature for purposes of cost-effective mass production. Moreover, alignment channels 154 and 156 (FIG. 2) are formed in both housing sections 33a and 33b to facilitate simple and accurate alignment of the combination motor assembly 44 and blade assembly 12 within motor housing portion 36 such that blade assembly 12 extends through a forward opening 158 formed in housing 32 below shield portion 42.

The preferred embodiment of blade assembly 12 includes various novel features that significantly advance the related field of technology, with such features now being described in a manner setting forth the best mode contemplated for carrying out this invention. More particularly, cutting blade 16 is constructed to cooperate with combing blade 14 to establish a dual-mode cutting action along at least one common longitudinal edge of blade assembly 12. To this end, cutting blade 16 is shown in FIGS. 5 and 6 to include an elongated blade segment 160 in addition to yoke segment 100 which together form an elongated planar blade component. As seen from FIG. 6, a series of guide slots 26 are formed on blade segment 160 along its longitudinal centerline, as indicated by reference line 162, and which, as noted, cooperate with sleeved fasteners 20 to facilitate reciprocatory rectilinear movement of cutting blade 16 relative to stationary combing blade 14 and cover plate 18 in response to controlled energization of motor assembly 44. Furthermore, a series of apertures 164 are formed in blade segment 160 on opposite sides of guide slots 26 to reduce the mass of cutting blade 16 for reducing its inertia and power requirements. Cutting blade 16 is preferably blanked from a pre-hardened material, such as, for example, a material sold by Inland Steel Corp. under the tradename "Martinsite 220". However, skilled practitioners will appreciate that any suitable material (i.e., heat treated cold or hot rolled steels and the like) providing the requisite strength and hardness can be used to manufacture cutting blade 16.

In a preferred form, blade segment 160 is a double-edged blade segment having a series of cutter teeth 170 formed on each of its longitudinal edges which extend transversely to longitudinal axis 162. With particular reference to FIGS. 6 through 9, each cutter tooth 170 is shown to extend outwardly from an edge surface 172 and is defined by a compound toothform that is symmetrical about a tooth centerline, as indicated by reference line 174, and which is normal to centerline 162 of cutting blade 16. Each cutter tooth 170 has a pair of first tooth segments 176 which are oppositely facing and beveled from a planar upper surface 178 of blade segment 160 to its planar lower surface 180 for defining a sharpened cutting edge 182 along its entire lateral length. Tooth segments 176 are each joined to edge surface 172 via a suitably radiused transition surface 184. As best seen from FIGS. 7 and 8, each cutter tooth 170 is wider at its distal end portion than at its proximal base or root portion such that tooth segments 176 diverge relative to tooth centerline 174 at an angle "A" in the range of 3° to 10° and preferably at about a 5° angle. Finally, each tooth segment 176 has a pointed distal tip 186 due to it having a back-angled edge surface 188 that conjoins lateral edge surface 172. Preferably, each edge surface 188 is back-angled relative to a reference line, designated by numeral 190, passing through tips 186 and which is normal to tooth centerline 174 to form an angle "B" in the range of 10° and 30° and, more preferably, of about 20°. For purposes of clarity, first tooth segments 176 of the compound toothform for cutter teeth 170 will hereinafter referred to as "shear" teeth 176.

Figure 7:
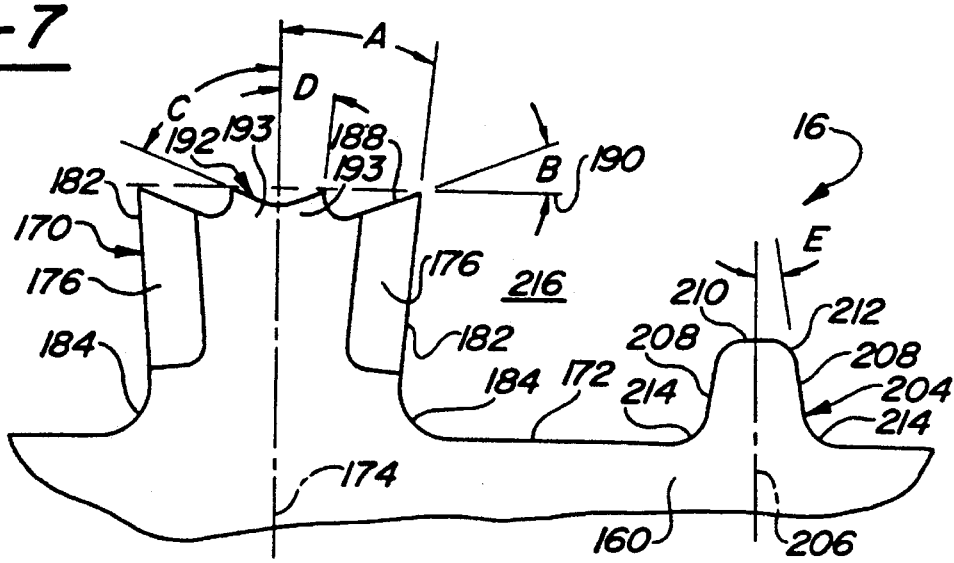
FIG. 7 is an enlarged fragmentary view of a preferred compound tooth profile for the cutter teeth of the present invention formed along the longitudinal edges of the movable cutting blade, and further showing its relationship to a sizing lug formed adjacent thereto.
Figure 8:
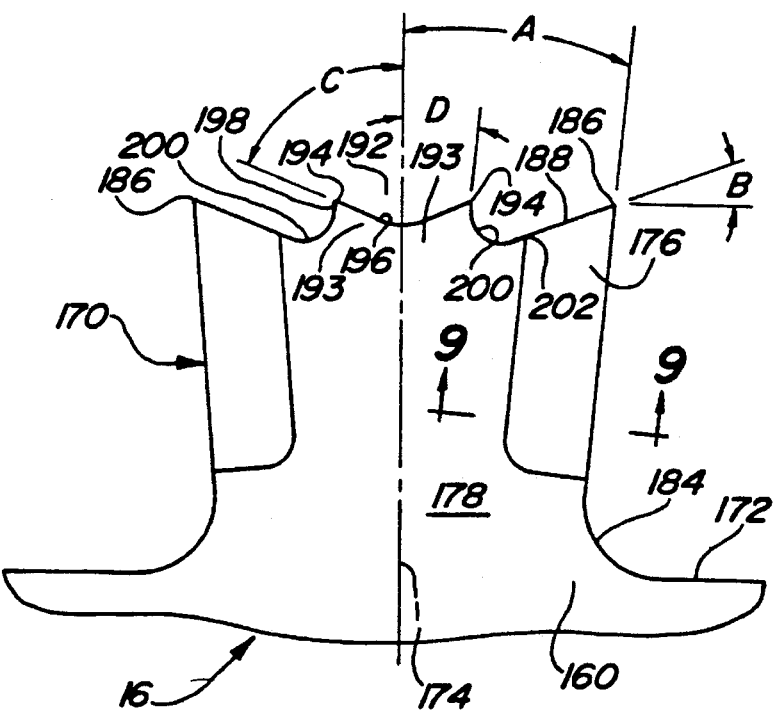
FIG. 8 is a further enlarged fragmentary view of the cutter tooth of the present invention shown in FIG. 7.
Figure 9:
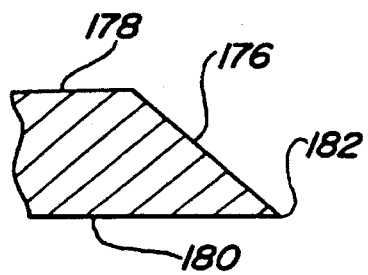
FIG. 9 is a sectional view taken along line 9—9 of FIG. 8.

With continued reference to FIGS. 7 and 8, the compound toothform for cutter teeth 170 is also shown to include a second tooth segment 192 comprising a pair of oppositely facing full-thickness "saw" teeth 193 having sharp points 194 that are generally aligned with distal tips 186 of shear teeth 176 along reference line 190. Saw teeth 193 each include a back-angled edge 196 establishing an angle "C" relative to tooth centerline 174 in the range of 50° to 80° and preferable of about 70°. Moreover, the pair of back-angled edge surfaces 196 join at a suitable radius point located on tooth centerline 174. In addition, a generally arcuate transition edge surface 200 conjoins a proximal point 202 of back-angled edge surface 188 of shear teeth 70 and points 194 of saw teeth 193. Arcuate transition edge surfaces 200 preferably include a short linear edge segment 198, contiguous to point 194 and that forms an angle "D" with tooth centerline 174 in the range of 3° to 10° and most preferably of about 5°. It will be readily noted that, according to the preferred toothform construction disclosed, distal tips 186 of shear teeth 176 are aligned to contact the vegetation to be saw cut so as to work cooperatively with saw teeth 193 for establishing the multi-stroke sawing action. However, those skilled in this art will recognize that modifications can be made to the compound toothform such as, for example, lowering distal tips 186 of shear teeth 176 below sharp points 194 of saw teeth 193 for altering the interaction of shear teeth 176 and saw teeth 193.

To provide means for segregating and aligning plant growth by its size for subsequent single-stroke "shear-cutting" by shear teeth 176 or multi-stroke "saw-cutting" by saw teeth 193, a series of sizing lugs 204 are formed on blade segment 160 of cutting blade 16 between adjacent pairs of cutter teeth 170. As seen from FIGS. 6 and 7, sizing lugs 204 extend outwardly from longitudinal edge surfaces 172 in the general plane of blade segment 160 and are symmetrical about an imaginary centerline, shown in FIG. 7 by reference line 206. Sizing lugs 204 are shown to be wider at their root than at their distal end such that opposite lateral edge surfaces 208 converge toward centerline 206 at an angle "E" of about 10°. Sizing lugs 204 also include a transverse top surface 210 connecting convergent lateral edge surface 208 and which includes rounded corners 212. Finally, the transition between each lateral edge surface 208 and longitudinal edge surface 172 of blade segment 160 is radiused, as shown by transition surfaces 214. As will be detailed, the outward length of sizing lugs 204 from longitudinal edge surface 172 and the longitudinal width of entrapment channels 216 formed between adjacent cutter teeth 170 and sizing lugs 204 (as bounded by a cutting edge 182 of shear teeth 176, longitudinal edge surface 172 of blade segment 160 and a lateral edge 208 of sizing lugs 204) are selected to segregate plant growth by size for subsequent shear or saw cutting.

Figure 11:
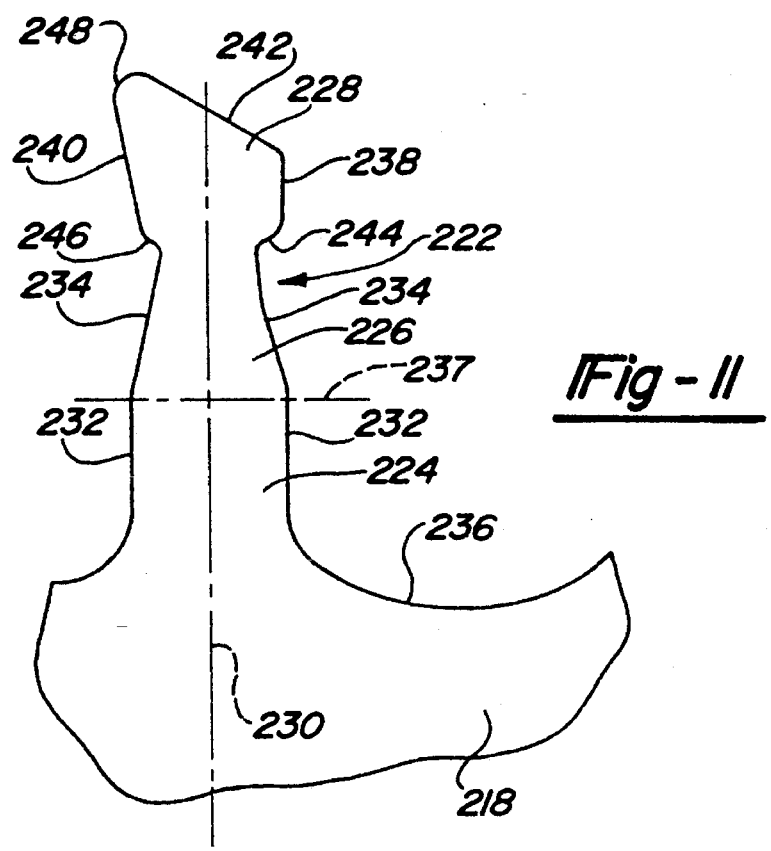
FIG. 11 is an enlarged fragmentary view of a preferred tooth profile for the comb teeth formed along the longitudinal edges of the stationary combing blade of the present invention.

Turning now with particular attention to FIGS. 10 and 11, a preferred structure for combing blade 14 is shown to include an elongated blade segment 218 in addition to mounting segment 94 which together form a planar blade component. As seen, mounting apertures 24 are formed along its longitudinal centerline, indicated by reference line 220, which, in turn, is aligned with centerline 162 of cutting blade 16 for establishing a common longitudinal centerline for blade assembly 12. Preferably, blade segment 218 is double-edged and has a series of comb teeth 222 formed on each of its longitudinal edges. Comb teeth 222 are symmetrical relative to longitudinal centerline 220 and also define a compound toothform. More particularly, each comb tooth 222 has a root segment 224, an intermediate shear comb segment 226, and a distal saw comb segment 228. Root segments 224 and shear comb segments 226 are symmetrical about a tooth centerline, indicated by reference line 230, while saw comb segments 228 are non-symmetrical relative thereto. In particular, root segments 224 include a pair of oppositely facing edge surfaces 232 that are generally parallel to tooth centerline 230. Shear comb segments 226 are defined by a pair of oppositely facing edge surfaces 234 that are angulated relative to edge surfaces 232 so as to converge toward tooth centerline 230 at an angle of about 15°. Facing pairs of edge surfaces 232 formed on adjacent comb teeth 222 are interconnected by a scalloped edge surface 236 of blade segment 218. Combing blade 14 is preferably blanked in a progressive blanking operation and manufactured from a cold rolled low carbon steel or an equivalent thereto.

Upon assembly of blade assembly 12, the junction between edge surface 232 and edge surface 234, identified by imaginary line 237 in FIG. 11, on each comb tooth 222 is generally aligned with longitudinal edge 172 of cutting blade segment 160. Thus, root segments 224 are recessed relative to the cutting path of cutter teeth 170. Moreover, the outward length of shear comb segments 226 is approximately equal to the outward length of cutter teeth 170 such that shear comb segments 226 cooperate with shear teeth 176 for facilitating single stroke "shear-cutting" of plant growth introduced into entrapment channels 216. More particularly, shear comb segments 226 are configured to hold smaller twigs and branches in place during a stroke of cutting blade 16 relative to combing blade 14 so as to permit a shear-cutting action as shear teeth 176 move relative thereto. Preferably, each comb tooth 222 has a corresponding cutter tooth 170 with their respective tooth centerlines 174 and 230 commonly aligned when cutting blade 16 is fully retracted (FIG. 12) or fully extended (FIG. 14) relative to combing blade 14. Moreover, the angular cutting edge of shear teeth 176 and the angular lateral edges 234 of shear comb segments 226 are adapted to facilitate a smooth and progressive shear-cutting action instead of an undesirably abrupt high-impact cutting action.

As noted, saw comb segments 228 of comb teeth 222 are non-symmetrical relative to tooth centerline 230. Moreover, saw comb segments 228 are generally bulbous projections each having a longitudinal length that is greater than that of its corresponding root segment 224. In particular, each saw comb segment 228 includes a first lateral edge 238, a second lateral edge 240, and a transverse edge 242 therebetween. As seen from FIG. 11, first lateral edge 238 is generally parallel to tooth centerline 230 with an arcuate transition surface 244 between it and lateral edge 234 of shear comb segment 226. However, second lateral edge 240 diverges outwardly away from tooth centerline 230 at an angle of about 12° and includes an arcuate transition surface 246 joining with its corresponding lateral edge 234 of shear comb segment 226. Moreover, transverse edge 242 converges toward second lateral edge 240 to establish an angle of about 48° relative thereto and has an arcuate transition surface 248 connecting it to second lateral edge 240 for establishing a generally rounded distal tip. FIG. 10 shows that the end of blade segment 218 includes a widened web segment 250 which terminates with a planar end surface 252 that is normal to longitudinal centerline 220 and which is cut through a portion of the last comb tooth 222'. In operation, the end surface 254 of cutting blade 16 does not move past planar end surface 252 of combing blade 14 such that blade assembly 12 can be butted against a wall surface or the like for pruning plant growth located in close proximity thereto.

Figure 12:
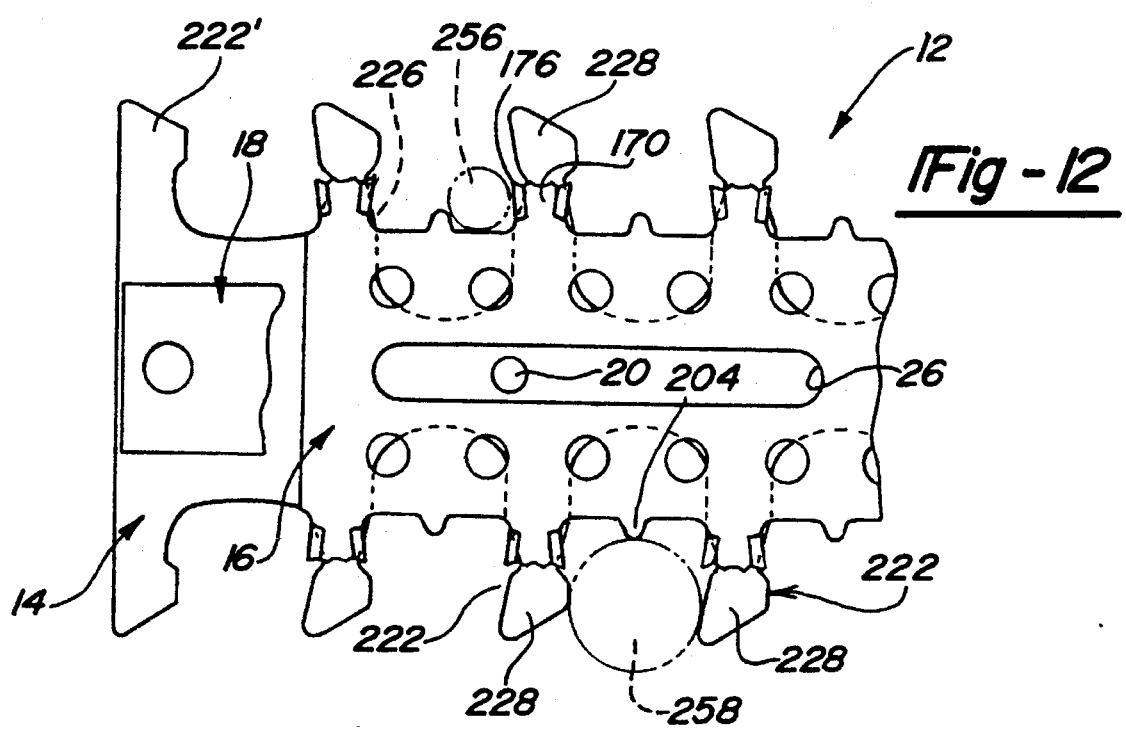
FIGS. 12, 13 and 14 are enlarged plan views of the distal end portion of the blade assembly shown in FIG. 1 with the movable cutting blade shown at different positions relative to the stationary combing blade.
Figure 13:
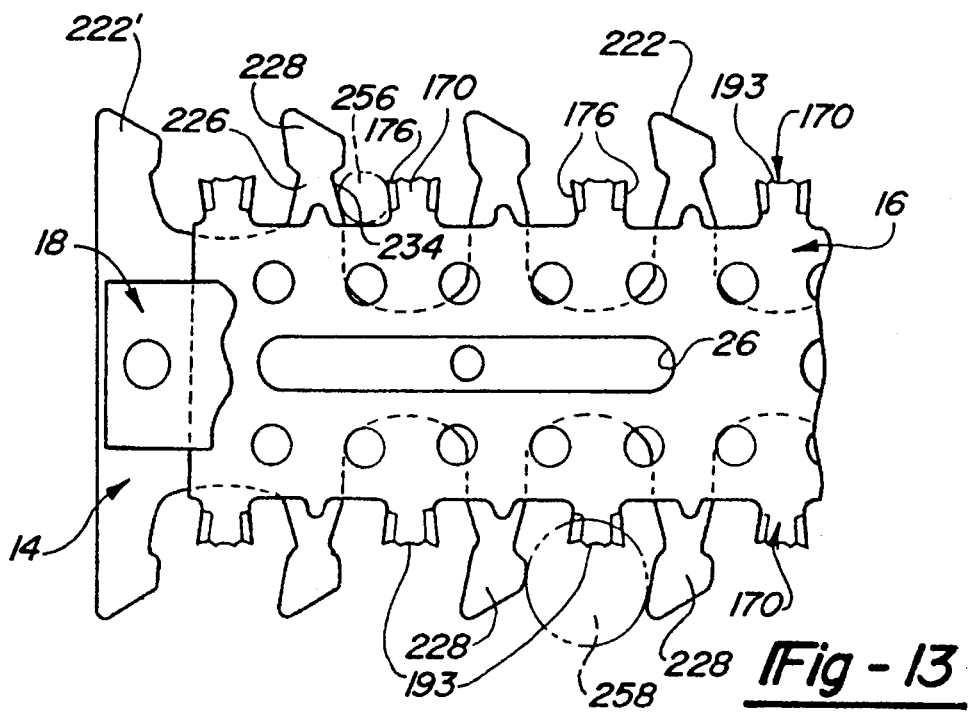
Figure 14:
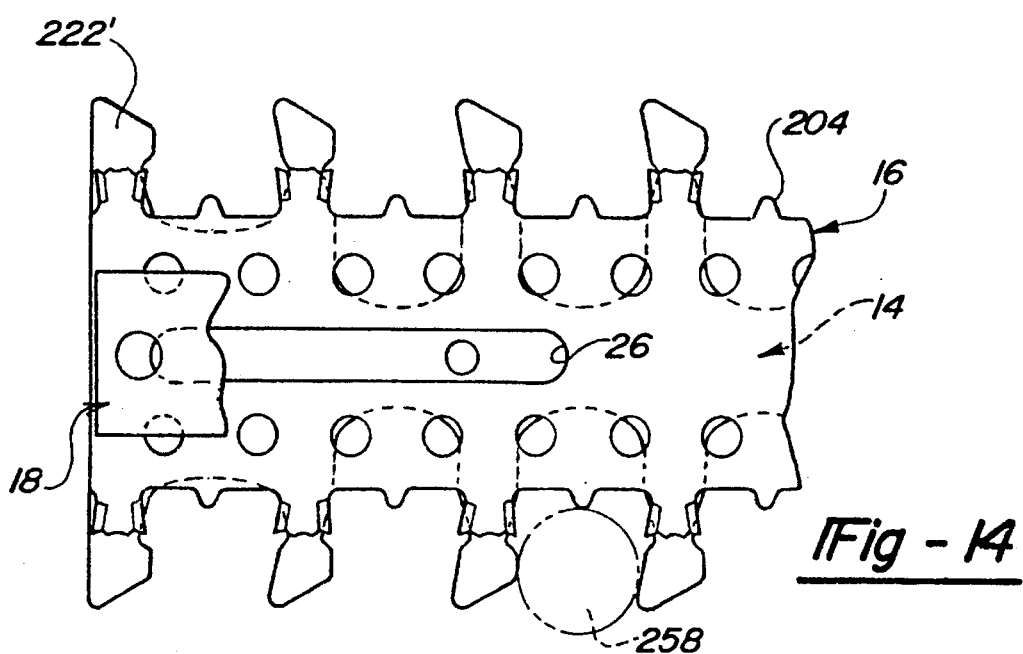

With reference now to FIGS. 12 through 14, an exemplary forward stroke of a reciprocating cutting cycle is shown for blade assembly 12 with a small diameter twig shown in phantom at 256 and a large diameter branch shown in phantom at 258. As seen, small diameter twig 256 is seated within an entrapment channel 216 to be "shear" cut between a corresponding shear tooth 176 and shear comb segment 226 during a single forward stroke of cutting blade 16 relative to stationary combing blade 14. Also, large diameter branch 258 is seated on top of a sizing lug 204 and between adjacent saw comb segments 228 to be saw cut by saw teeth 193 during multiple fore and aft strokes of cutting blade 16 relative to combing blade 14. Thus, the opening between adjacent saw comb segments 228 of comb teeth 222 is selected to establish a first size threshold for defining a maximum size limitation on the plant growth that can be introduced into the cutting path of cutting blade 16. In addition, entrapment channels 216 are sized to establish a second size threshold for defining a maximum size limitation on the plant growth that can be sheared. As such, if the plant growth is smaller in size than the second size limitation, it will enter an entrapment channel 216 and be subsequently sheared. However, if the plant growth is larger in size than the second size limitation yet smaller than the first size limitation, the plant growth will be seated on top of a sizing lug 204 and cut with a sawing action. Thus, the present invention provides a blade assembly construction for power-operated hedge trimmers that integrates a dual-cutting action (i.e., sawing and shearing) into a common cutting edge. Accordingly, the operator can use hedge trimmer 10 in a manner similar to that of a conventional shear-type hedge trimmer without the need of excessive manipulation or cognitive size classification associated with the prior art combination trimmer/reciprocating saw devices.

Figure 15:
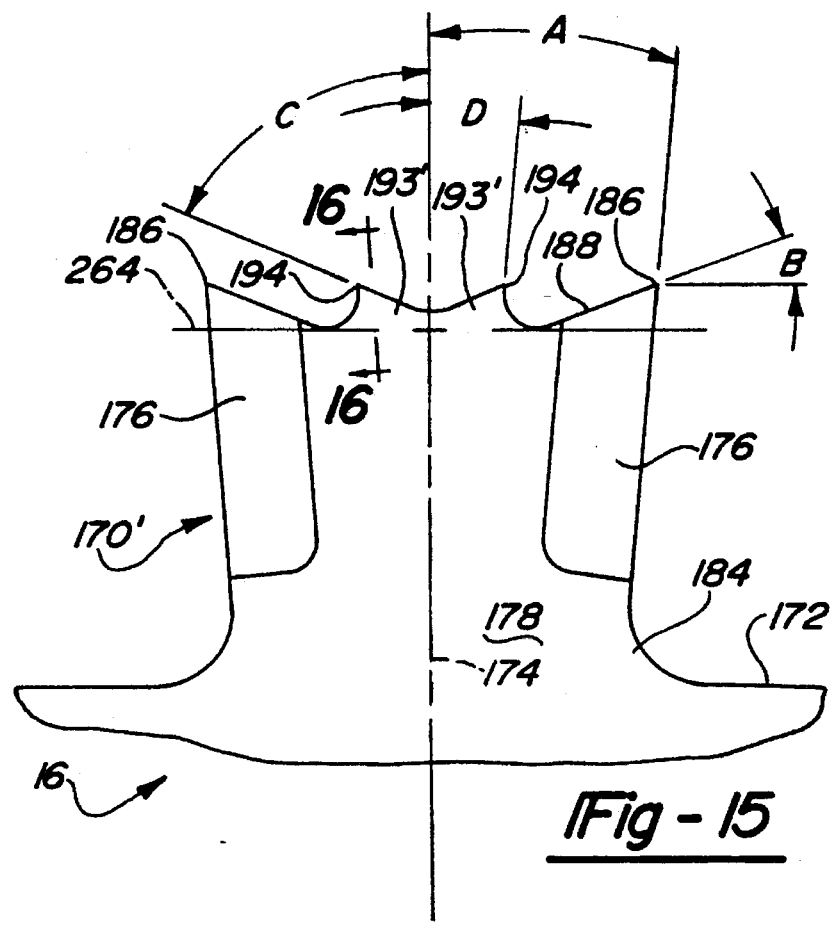
FIG. 15 is a view, similar to FIG. 8, illustrating an alternative tooth profile for the cutter teeth of the present invention wherein the saw tooth segment is offset from the general plane of the cutting blade.
Figure 16:
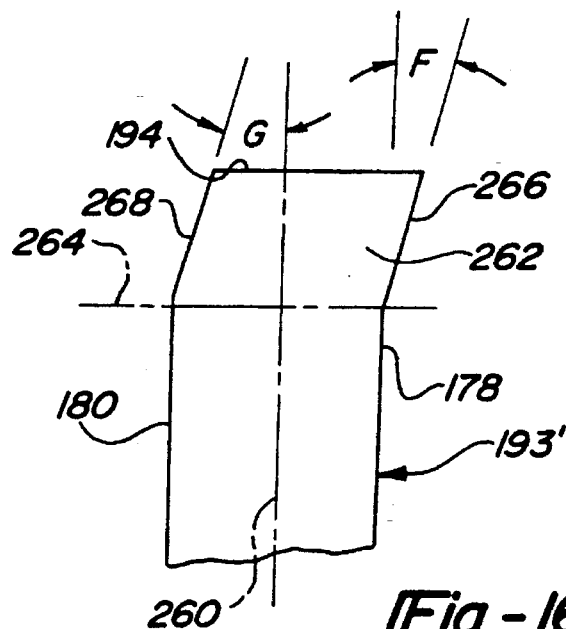
FIG. 16 is a sectional view taken along line 16—16 of FIG. 15.

With particular reference now to FIGS. 15 and 16, a modified construction for the cutter teeth, hereinafter designed by numeral 170', is shown which generally is directed to providing a "set" to saw tooth segments 193' for increasing the kerf generated by the saw-cutting action. For purpose of brevity, those components or elements of cutter teeth 170' that are identical or substantially similar in construction and function to those described in reference to cutter teeth 170 will be identified with like reference numerals.

With continued reference to FIGS. 15 and 16, the compound toothform for cutter teeth 170' is shown to include a first tooth segment comprised of a pair of "shear" teeth 176 that are formed symmetrically relative to tooth centerline 174. The compound toothform for cutter teeth 170' is also shown to include a second tooth segment comprising a pair of full thickness "saw" teeth 193'. To provide a wider kerf, saw teeth 193' have been offset or "set" outwardly from the general plane of blade segment 160 which is identified in FIG. 16 by reference line 260. As such, a portion 262 of each saw tooth 193' above a bend line 264 is offset to extend outwardly past planar upper surface 178 of blade segment 160. In particular, an outer surface 266 of saw teeth 193' forms an angle "F" with planar surface 178 in the range of about 1° to 5° and most preferably of about 2°. Similarly, an inner surface 268 of saw teeth 193' forms an angle "G" with centerline 260 in the range of about 1° to 10° and most preferably of about 4°.

The surfaces 266 and 268 are preferably deformed out of the general plane of blade segment 160 via a coining operation which can be performed sequentially with the blade blanking operation. It will be appreciated that the distal portion of shear teeth 176 above bend line 264 could also be coined to form an oppositely extending set with respect to the set of saw teeth 193' so as to produce an alternating tooth set profile. However, setting of the shear teeth requires a corresponding set to be formed in comb teeth 222 on combing blade 14 to establish a sliding clearance relative to shear teeth 176 on moving cutting blade 16. According to a further modified construction, each one of the pair of saw teeth 193' can be formed with an alternating set if so desired. Again, any inward set formed on a cutting blade 16 would possibly necessitate the formation of a corresponding set on the comb teeth 222. For each case, saw teeth 193' extend beyond at least one outer face of blade segment 160 and consequently produce a saw cut on the vegetation which is wider than the material thickness of the cutting blade 16 itself.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A hand-held power-operated tool for cutting plant growth, comprising:

a housing containing a motor;

a blade assembly having first and second elongated blades extending forwardly in a lengthwise direction from said housing; and a drive mechanism coupling said first elongated blade to an output of said motor for causing reciprocating rectilinear movement thereof relative to said second elongated blade;

said first blade having a series of cutter teeth and sizing lugs formed along at least one of its longitudinal edges, each of said cutter teeth having a shear tooth segment formed along its opposite lateral edges and a saw tooth segment formed at its distal end between said shear tooth segments, said sizing lugs cooperate with said cutter teeth for aligning smaller plant growth up to a threshold size limit adjacent to one of said shear tooth segments and aligning larger plant growth exceeding said threshold size limit adjacent to said saw tooth segment, said second blade having a series of comb teeth formed along a longitudinal edge thereof that overlap said cutter teeth on said first blade, and wherein said shear tooth segments cooperate with said comb teeth for shear-cutting said smaller plant growth introduced therebetween during a single stroke of said first blade, and said saw tooth segments are provided for saw-cutting said larger plant growth which are received between said comb teeth during multiple strokes of said first blade.

2. The power-operated tool of claim 1 wherein said sizing lugs are formed between adjacent cutter teeth for establishing entrapment channels therewith, whereby plant growth up to said threshold size limit is drawn into said entrapment channels for alignment relative to said shear tooth segments, and plant growth exceeding said threshold size limit is prevented from entering said entrapment channels by said sizing lugs for alignment relative to said saw tooth segments of said cutter teeth.

3. The power-operated tool of claim 2 wherein said comb teeth include a first comb tooth segment arranged to cooperate with a corresponding shear tooth segment of said cutter teeth for trapping and subsequently shearing plant growth therebetween in response to a single stroke of said first blade relative to said second blade, and a second comb tooth segment arranged to retain plant growth exceeding said threshold size limit between adjacent comb teeth and relative to said saw tooth segments of said cutter teeth for multi-stroke saw-cutting thereof.

4. The power-operated tool of claim 2 wherein each of said cutter teeth is symmetrical about a tooth centerline with said shear tooth segments being oppositely facing and bevelled to form sharpened cutting edges along their respective lateral length, said shear tooth segments each diverging outwardly relative to said tooth centerline such that said sharpened lateral edges are angled with respect thereto.

5. The power-operated tool of claim 4 wherein said shear tooth segments each have a pointed distal tip defined between its angled sharpened lateral edge and a back-angled transverse edge.

6. The power-operated tool of claim 5 wherein said pointed distal tip of said shear tooth segments is commonly aligned with a distal point of said saw tooth segments for cutting plant growth exceeding said threshold size limit during multiple-stroke saw cutting.

7. The power-operated tool of claim 4 wherein each of said first comb tooth segments is symmetrical about a comb tooth centerline and includes a pair of oppositely facing angled lateral edge surfaces that are outwardly convergent toward said comb tooth centerline.

8. The power-operated tool of claim 7 wherein said angled lateral edge surfaces of said first comb segments cooperate with said angled lateral edges of said shear tooth segments for generating a progressive shear cutting action therebetween.

9. The power-operated tool of claim 1 wherein said saw tooth segments of said cutter teeth are offset relative to a longitudinal plane of said first blade.

10. The power-operated tool of claim 9 wherein each of said saw tooth segments is symmetrical about a tooth centerline to define a pair of saw teeth, and wherein said saw teeth are offset in opposite directions relative to each other.

11. The power-operated tool of claim 9 wherein said shear tooth segments are offset in an opposite direction relative to the offset of said saw tooth segments.

12. A portable power-operated tool comprising a housing containing a motor, a blade assembly having first and second elongated blades extending forwardly in a lengthwise direction from the housing, and a drive mechanism coupling the first elongated blade to an output of the motor for causing reciprocating rectilinear movement thereof relative to said second elongated blade, said first blade having a series of cutter teeth formed along at least one of its longitudinal edges with each of said cutter teeth having a shear tooth segment formed along its opposite lateral edges and a saw tooth segment formed at its distal end between said shear tooth segments, said first blade further including sizing lugs formed between adjacent cutter teeth for aligning plant growth up to a predetermined size limit relative to an adjacent one of said shear tooth segments and aligning plant growth exceeding said predetermined size limit relative to said saw tooth segments, said shear tooth segments cooperating with comb teeth formed on said second blade for shear-cutting plant growth introduced therebetween during a single stroke of said first blade, and said saw tooth segments being arranged for saw-cutting plant growth with multiple strokes of said first blade.

13. The power-operated tool of claim 12 wherein said sizing lugs are formed between adjacent cutter teeth for establishing entrapment channels therewith, whereby plant growth up to said predetermined size limit is drawn into one of said entrapment channels for alignment relative to an adjacent shear tooth segment, and plant growth exceeding said predetermined size limit contacts one of said sizing lugs for alignment relative to said saw tooth segments of adjacent cutter teeth.

14. The power-operated tool of claim 13 wherein said comb teeth each includes a first comb tooth segment arranged to cooperate with a corresponding shear tooth segment of said cutter teeth for shearing plant growth introduced therebetween, and a second comb tooth segment arranged to retain plant growth exceeding said predetermined size limit between adjacent comb teeth and relative to said saw tooth segments of said cutter teeth for multi-stroke saw-cutting thereof.

15. The power-operated tool of claim 14, wherein each of said first comb tooth segments is symmetrical about a comb tooth centerline and include a pair of oppositely facing angled lateral edge surfaces that are outwardly convergent toward said comb tooth centerline, and wherein said outwardly convergent angled lateral edge surfaces of said first comb segments cooperate with said outwardly divergent angled lateral edges of said shear tooth segments to generate a progressive shear cutting action in response to the movement of said first blade relative to said second blade.

16. The power-operated tool of claim 13 wherein each of said cutter teeth is symmetrical about a tooth centerline with said shear tooth segments being oppositely facing and bevelled to form sharpened cutting edges along their respective lateral length, said shear tooth segments each diverging outwardly relative to said tooth centerline such that said sharpened lateral edges are angled with respect thereto.

17. The power-operated tool of claim 16 wherein said shear tooth segments each have a pointed distal tip defined between its angled sharpened lateral edge and a back-angled transverse edge.

18. The power-operated tool of claim 17 wherein said pointed distal tip of each of said shear tooth segments is commonly aligned with a distal point of said saw tooth segments.

19. The power-operated tool of claim 12 wherein said saw tooth segments of said cutter teeth are offset relative to a longitudinal plane of said first blade.

20. The power-operated tool of claim 19 wherein each of said saw tooth segments is symmetrical about a tooth centerline to define a pair of saw teeth, and wherein said saw teeth are offset in opposite directions relative to each other.

21. The power-operated tool of claim 12 wherein said shear tooth segments are offset in an opposite direction relative to an offset of said saw teeth segments.

22. A method of cutting vegetation comprising the steps of:

providing a hedge trimmer having a housing, a motor assembly contained in said housing, a blade assembly having first and second blades extending in a lengthwise direction from said housing, and a drive mechanism coupling said first blade to an output of said motor assembly for causing reciprocating movement thereof relative to said second blade, said first blade having an alternating series of cutter teeth and sizing lugs formed along at least one longitudinal edge for establishing entrapment channels therebetween, each cutter tooth having a shear tooth segment formed along its opposite lateral edges and a saw tooth segment formed along its distal edge, and said second blade having comb teeth formed along a longitudinal edge which overlap said cutter teeth on said first blade;

introducing plant growth to be cut into a cutting pathway established between said first and second blades of said blade assembly;

drawing small plant growth of a size below a threshold size limited into said entrapment channels;

shearing said small plant growth between a shear tooth segment and a comb tooth during a single stroke of said first blade relative to said second blade;

drawing large plant growth of a size exceeding said threshold size limit against said sizing lugs and into alignment with said saw tooth segments; and sawing said larger plant growth received between said comb teeth with said saw tooth segments of said cutter teeth during multiple strokes of said first blade relative to said second blade.

23. The method of claim 22 wherein said sizing lugs prevent said larger plant growth from being drawn into said entrapment channels and align said larger plant growth relative to said saw tooth segments of said cutter teeth for saw cutting thereof.

24. A hand-held power-operated tool for cutting plant growth, comprising:

a housing;

a first blade having a series of cutter teeth formed along at least one of its longitudinal edges and sizing lugs formed between adjacent cutter teeth for establishing entrapment channels therewith, each of said cutter teeth having a shear tooth segment formed along its opposite lateral edges and a saw tooth segment formed at its distal end between said shear tooth segments, whereby plant growth of a size up to a predetermined size limit is permitted to enter said entrapment channels for alignment relative to shear tooth segments and plant growth exceeding said predetermined size limit is prevented from entering said entrapment channels for alignment relative to said saw tooth segments;

a second blade having a series of comb teeth formed along a longitudinal edge thereof that overlap said cutter teeth on said first blade, said comb teeth include a first comb tooth segment arranged to cooperate with a corresponding shear tooth segment of said cutter teeth for shearing plant growth therebetween in response to a single stroke of said first blade relative to said second blade, and a second comb tooth segment arranged to retain plant growth exceeding said predetermined size limit between adjacent comb teeth and relative to said saw tooth segments of said cutter teeth for sawing such plant growth in response to multiple strokes of said first blade relative to said second blade; and a power-operated mechanism contained in said housing and coupled to said first and second blades for causing reciprocating relative movement therebetween.

25. The power-operated tool of claim 24 wherein each of said cutter teeth is symmetrical about a tooth centerline with said shear tooth segments being oppositely facing and having sharpened lateral edges, said shear tooth segments each diverging outwardly relative to said tooth centerline such that said sharpened lateral edges are angled with respect thereto, and wherein said shear tooth segments each have a pointed distal tip defined between its sharpened lateral edge and an outer transverse edge.

26. The power-operated tool of claim 25 wherein said pointed distal tip on each of said shear tooth segments is commonly aligned with a distal point of said saw tooth segments to work in conjunction with said saw tooth segments for sawing plant growth exceeding said predetermined size limit.

27. The power-operated tool of claim 25 wherein each of said first comb tooth segments is symmetrical about a comb tooth centerline and includes a pair of oppositely facing angled lateral edge surfaces that are outwardly convergent toward said comb tooth centerline, said angled lateral edge surfaces adapted to cooperate with said sharpened lateral edges of said shear tooth segments for generating a progressive shear cutting action therebetween.

28. The power-operated tool of claim 24 wherein said saw tooth segments of said cutter teeth are offset relative to a longitudinal plane of said first blade.

29. The power-operated tool of claim 28 wherein each of said saw tooth segments is symmetrical about a tooth centerline to define a pair of saw teeth, and wherein said pair of saw teeth are offset in opposite directions relative to each other.

30. The power-operated tool of claim 28 wherein said shear tooth segments are offset in an opposite direction relative to an offset of said saw tooth segments.

31. A blade assembly for a hedge trimmer comprising:

a first blade having a series of cutter teeth formed along at least one of its longitudinal edges with each of said cutter teeth having a shear tooth segment formed along its opposite lateral edges and a saw tooth segment formed at its distal end between said shear tooth segments, said first blade further having sizing lugs that are formed between adjacent cutter teeth for establishing entrapment channels therewith such that smaller plant growth of a size up to a predetermined size limit can enter said entrapment channels for alignment relative to shear tooth segments, and larger plant growth exceeding said predetermined size limit abuts one of said sizing lugs for preventing entrance into said entrapment channels for alignment relative to said saw tooth segments of said cutter teeth;

a second blade having a series of comb teeth formed along a longitudinal edge thereof that overlap said cutter teeth on said first blade, said comb teeth cooperate with said shear tooth segments for shearing said smaller plant growth introduced therebetween during a single stroke of said first blade relative to said second blade, and said comb teeth align said larger plant growth therebetween for holding the larger plant growth relative to said saw tooth segments for sawing such larger plant growth during multiple strokes of said first blade relative to said second blade.

32. The blade assembly of claim 31 wherein each of said comb teeth includes a first comb tooth segment arranged to cooperate with a corresponding shear tooth segment for shearing said smaller plant growth therebetween in response to a single stroke of said first blade relative to said second blade, and said comb teeth include a second comb tooth segment arranged to retain said larger plant growth between adjacent comb teeth for alignment relative to said saw tooth segments of said cutter teeth for sawing such larger plant growth in response to multiple reciprocable strokes of said first blade relative to said second blade.

33. The blade assembly of claim 32 wherein each of said first comb tooth segments is symmetrical about comb tooth centerline and includes a pair of oppositely facing angled lateral edge surfaces that are outwardly covergent toward said comb tooth centerline, said angled lateral edge surfaces of said first comb segments cooperate with said sharpened lateral edges of said shear tooth segments for generating a progressive shear cutting action therebetween.

34. The blade assembly of claim 31 wherein each of said cutter teeth is symmetrical about a tooth centerline with said shear tooth segments being oppositely facing and tapered on their lateral edges to form sharpened cutting edges, said shear tooth segments each diverging outwardly relative to said tooth centerline such that said sharpened lateral edges are angled with respect thereto, and wherein said shear tooth segments each have a pointed distal tip defined between its angled sharpened lateral edge and a back-angled transverse edge, said pointed distal tips being aligned with said saw tooth segments for sawing plant growth exceeding said predetermined size limit.

35. The blade assembly of claim 31 wherein said saw tooth segments of said cutter teeth are offset with respect to a longitudinal plane of said first blade.

36. A blade assembly for a portable power-operated tool of the type having a housing containing a motor, said blade assembly comprising first and second elongated blades extending forwardly in a lengthwise direction from the housing with said first blade coupled to an output of the motor for causing reciprocating rectilinear movement thereof relative to said second blade, said first blade having a series of cutter teeth extending outwardly from at least one of its longitudinal edges, each of said cutter teeth having a compound toothform including a shear tooth segment formed along each lateral edge and a saw tooth segment formed at a distal end between said shear tooth segments, said first blade further including sizing lugs formed between adjacent cutter teeth for permitting alignment of smaller plant growth up to a predetermined size limit relative to an adjacent one of said shear tooth segments and for aligning larger plant growth exceeding said predetermined size limit relative to said saw tooth segments, said shear tooth segments cooperating with comb teeth formed on said second blade for shear-cutting said smaller plant growth introduced therebetween during a single stroke of said first blade relative to said second blade, and said saw tooth segments being arranged for saw-cutting said larger plant growth with multiple strokes of said first blade relative to said second blade.

37. The blade assembly of claim 36 wherein said sizing lugs establish entrapment channels with adjacent shear tooth segments such that said smaller plant growth can enter one of said entrapment channels for alignment relative to an adjacent shear tooth segment and said larger plant growth contacts one of said sizing lug for alignment relative to said saw tooth segments.

38. The blade assembly of claim 36 wherein said comb teeth each includes a first comb tooth segment arranged to cooperate with a corresponding shear tooth segment of said cutter teeth for shearing said smaller plant growth introduced therebetween, and a second comb tooth segment arranged to retain said larger plant growth between adjacent comb teeth and relative to said saw tooth segments of said cutter teeth for multi-stroke saw-cutting thereof.

39. The blade assembly of claim 38 wherein each of said first comb tooth segments is symmetrical about a comb tooth centerline and includes a pair of oppositely facing angled lateral edge surfaces that are outwardly convergent toward said comb tooth centerline, and wherein said outwardly convergent lateral edge surfaces of said first comb segments cooperate with said outwardly divergent sharpened lateral edges of said shear tooth segments to generate a progressive shear cutting action is response to movement of said first blade relative to said second blade.

40. The blade assembly of claim 36 wherein each of said cutter teeth is symmetrical about a tooth centerline with said shear tooth segments being oppositely facing and tapered to form sharpened cutting edges along their respective lateral length, said shear tooth segments each diverging outwardly relative to said tooth centerline such that said sharpened lateral edges are angled with respect thereto.

41. The blade assembly claim 40 wherein said shear tooth segments each have a pointed distal tip defined between its sharpened lateral edge and a back-angled transverse edge.

42. The blade assembly of claim 41 wherein said pointed distal tip of each of said shear tooth segments is commonly aligned with a distal point of said saw tooth segments.

43. The blade assembly of claim 36 wherein said saw tooth segments of said cutter teeth are offset with respect to a longitudinal plane of said first blade.

44. A cutting blade of the type used in a portable power-operated tool and which reciprocates relative to a combing blade, said cutting blade comprising an elongated blade segment having a series of cutter teeth formed along at least one longitudinal edge therewith, each of said cutter teeth having a shear tooth segment formed along its opposite lateral edges and a saw tooth segment formed at its distal end between said shear tooth segments, said cutting blade further including sizing lugs formed on said blade segment between adjacent cutter teeth for aligning small plant growth of a size up to a predetermined size limit relative to an adjacent one of said shear tooth segments and aligning large plant growth exceeding said predetermined size limit relative to said saw tooth segments, said shear tooth segments cooperating with combing teeth formed on the combing blade for shearing said small plant growth introduced therebetween during a single stroke of said cutting blade, and said saw tooth segments arranged for sawing said large plant growth with multiple strokes of said cutting blade.

45. The cutting blade of claim 44 wherein said sizing lugs are formed between adjacent cutter teeth for establishing entrapment channels therewith, whereby said small plant growth is drawn into one of said entrapment channels for alignment relative to an adjacent shear tooth segment and said large plant growth contacts one of said sizing lugs for alignment relative to said saw tooth segments of adjacent cutter teeth.

46. The cutting blade of claim 44 wherein each of said cutter teeth is symmetrical about a tooth centerline with said shear tooth segments being oppositely facing and tapered to form sharpened lateral edges, said shear tooth segments each diverging outwardly relative to said tooth centerline such that said sharpened lateral edges are angled with respect thereto.

47. The cutting blade of claim 46 wherein said shear tooth segments each have a pointed distal tip defined between its angled sharpened lateral edge and a back-angled transverse edge.

48. The cutting blade of claim 47 wherein said pointed distal tip on each of said shear tooth segments is commonly aligned with a distal point of said saw tooth segments.

49. The cutting blade of claim 44 wherein each of said saw tooth segments is symmetrical about a tooth centerline to define a pair of saw teeth, and wherein said pair of saw teeth are offset in opposite directions relative to each other.

50. The cutting blade of claim 44 wherein said shear tooth segments are offset relative to a longitudinal plane of said blade segment.

51. A blade assembly for use in a portable power-operated tool comprising a cutting blade having cutter teeth formed on at least one longitudinal edge and which is reciprocated relative to a combing blade, said cutter teeth having a pair of shear tooth segments and a saw tooth segment between said shear tooth segments, said combing blade comprising a series of comb teeth adapted to cooperate with said shear tooth segments of said cutting blade for shearing smaller plant growth introduced therebetween during a single stroke of said cutting blade, said comb teeth adapted to cooperate with said saw tooth segments for sawing larger plant growth with multiple strokes of said cutting blade, said comb teeth each including a first comb tooth segment arranged to cooperate with a corresponding shear tooth segment for shearing said smaller plant growth introduced therebetween, and a second comb tooth segment arranged to retain said larger plant growth exceeding a predetermined size limit between adjacent comb teeth and relative to said saw tooth segments of said cutter teeth for multi-stroke saw-cutting thereof;

wherein each of said first comb tooth segments is symmetrical about a comb tooth centerline and includes a pair of oppositely facing angled lateral edge surfaces that are outwardly convergent toward said comb tooth centerline, and wherein said outwardly convergent angled lateral edge surfaces of said first comb segments cooperate with lateral edges of said shear tooth segments to generate a progressive shear cutting action in response to the reciprocating movement between said blades.

* * * * *